United States Patent [19]

Takahashi et al.

[11] Patent Number: 4,736,263

[45] Date of Patent: Apr. 5, 1988

[54] METHOD AND APPARATUS FOR DRIVING A DISK

[75] Inventors: Mikio Takahashi; Yasuo Yamamoto, both of Odawara; Yoshihiro Moribe, Chigasaki; Akira Chuma; Kazuo Nakagoshi, both of Odawara; Nobukuni Ohkubo, Kanagawa, all of Japan

[73] Assignee: Hitachi, Ltd., Tokyo, Japan

[21] Appl. No.: 766,803

[22] Filed: Aug. 19, 1985

[30] Foreign Application Priority Data

Sep. 29, 1984 [JP] Japan ................... 59-205315

[51] Int. Cl.⁴ ............... G11B 19/26; G11B 21/12; G11B 5/012; G11B 5/016
[52] U.S. Cl. ......................... 360/97; 360/69; 360/73; 360/75; 360/99; 369/258; 369/261
[58] Field of Search ............. 360/69, 71, 73, 74.1, 360/75, 86, 97–99, 137; 369/261, 258

[56] References Cited

U.S. PATENT DOCUMENTS 4,635,145  1/1987  Horie et al. ................ 360/69 X

FOREIGN PATENT DOCUMENTS

| 52-67307 | 6/1977 | Japan | 360/75 |
| 55-4731 | 1/1980 | Japan | 360/71 |
| 55-108963 | 8/1980 | Japan | 360/69 |
| 56-134357 | 10/1981 | Japan | 360/99 |
| 57-150168 | 9/1982 | Japan | 360/137 |
| 57-164473 | 10/1982 | Japan | 360/69 |
| 59-104761 | 6/1984 | Japan | 360/99 |
| 60-171672 | 9/1985 | Japan | 369/258 |

OTHER PUBLICATIONS

Murakami, "Drive Control Circuit of Motor for Floppy Disc", Patent Abstracts of Japan, vol. 4, No. 160, p. 35, Aug., 1980.

Primary Examiner—Stuart N. Hecker
Assistant Examiner—Benjamin E. Urcia
Attorney, Agent, or Firm—Antonelli, Terry & Wands

[57] ABSTRACT

In a disk unit having a rotating mechanism to rotate the disk by pinching the disk at both sides, and a loading mechanism to bring a read-write head into contact with the disk, a method for driving the disk includes the steps in which, at the time of recording and reproduction, the rotating mechanism and the loading mechanism are actuated simultaneously, and when the recording and reproduction are completed, the rotating mechanism is stopped simultaneously with release of the loading mechanism, or after the lapse of a predetermined time from the release.

10 Claims, 11 Drawing Sheets

METHOD AND APPARATUS FOR DRIVING A DISK

BACKGROUND OF THE INVENTION

The present invention relates to a method and apparatus for driving a magnetic disk and in particular, to a method and means for driving a magnetic disk in a floppy disk unit, which method enables to extend the life of the disk medium and to prevent the read-write head from joining to the surface of the medium.

In a prior art floppy disk unit, two types of methods for driving the disk are known. In one method, a spindle motor is maintained in steady rotation after the power supply is turned on, and the read-write head is loaded on the medium by a head loading mechanism at the time of recording and reproduction. In the other method, the head loading mechanism is not provided, and the read-write head is always maintained in contact with the medium. Further the spindle motor is operated to rotate at the time of recording and reproduction, and the rotation is stopped when finished. In the former, since the spindle motor is kept always rotating, power consumption is undesirably high, whereas in the latter, since the read-write head and the medium are always in contact with each other, wear, demagnetization, adhesion and the like of the medium are caused.

The structure and operation of the former methods will be described with reference to FIGS. 5 and 6.

Figure 5:
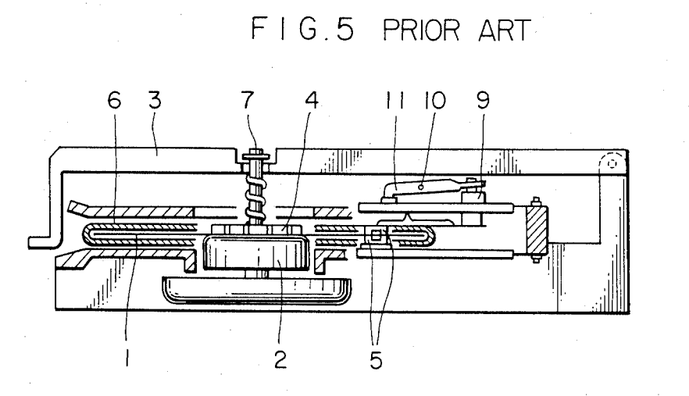
FIG. 5 is a cross-sectional structure view of a prior art floppy disk drive.

In FIG. 5, reference numeral 1 designates a recording disk, 2 designates a spindle, 3 designates a door arm, 4 designates a collet, 5 designates a magnetic head, 6 designates a protection case, 7 designates a shaft, 9 designates a solenoid, 10 designates a support pin, and 11 designates an arm.

When the power supply to a floppy disk unit is turned on, rotation operation of the spindle 2 is started, and a steady rotational speed N [rpm] is reached in a fixed time. After that, when a recording medium (the recording disk 1 covered by the protection case 6 is formed in a unit to constitute the recording medium) is inserted into the unit, the spindle 2 and the collect 4 clamp and hold the recording disk 1, and thus the recording disk 1 is driven. Thereafter, at the time of recording and reproduction (read-write), the solenoid 9 is operated by a head loading signal from a floppy disk controller to which the floppy disk unit is connected. When the solenoid 9-which performs raising and lowering operation is operated, by raising one end of the arm 11, the other end of the arm 11 is lowered using the support pin 10 as a support, and the read-write head 5 is brought into contact with the recording disk 1 through an intermediate object, and recording and reproduction operation is carried out.

Figure 6:
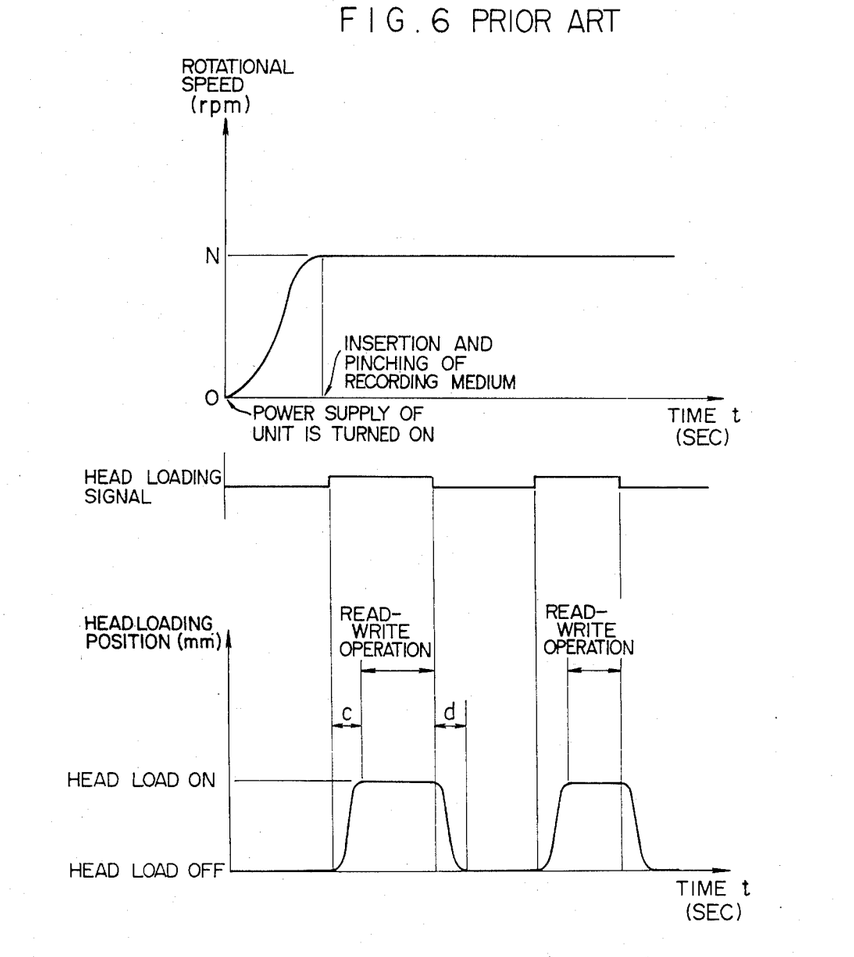
FIG. 6 is an operation time chart of the prior art floppy disk drive of FIG. 5.

FIG. 6 is an operating characteristic diagram of the floppy disk unit of FIG. 5.

Upon turning on the power supply to the unit, the spindle motor 6 is started, and the speed increases with the lapse of time and reaches the steady rotational speed N. Thereafter, by inserting the recording medium in the unit, the spindle 2 clamps and holds the recording disk 1. Further, when a magnet of the solenoid 9 is energized by the headloading signal from the floppy disk controller, the magnetic head 5 is moved toward the recording disk 1, and after c seconds from the headloading signal, recording and reproduction operation is carried out. When the recording and reproduction operation is completed, by issuing a HEAD LOAD OFF SIGNAL, the energization of the magnet of the solenoid 9 is shut off, and after the lapse d seconds from the receipt of the HEAD LOAD OFF SIGNAL the magnetic head 5 is completely separated from the recording disk 1 by a return spring.

As regards the latter method, the structure and operation of a floppy disk unit which has no head loading mechanism will be described with reference to FIGS. 7 to 9.

Figure 7:
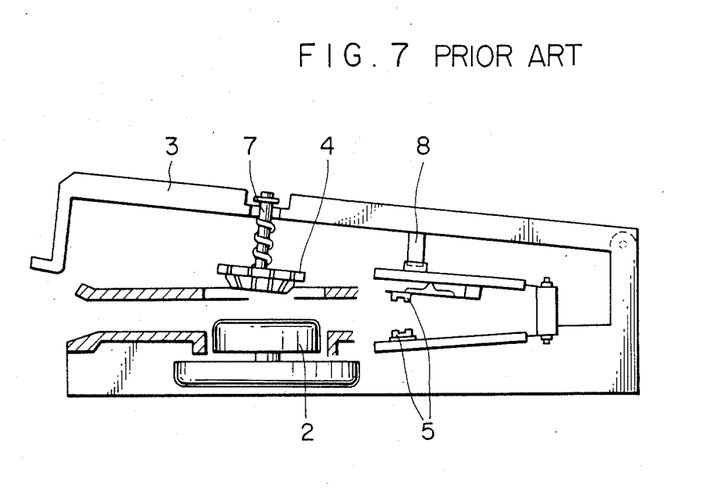
FIGS. 7 and 8 are cross-sectional structure views showing another example of prior art floppy disk drive.
Figure 8:
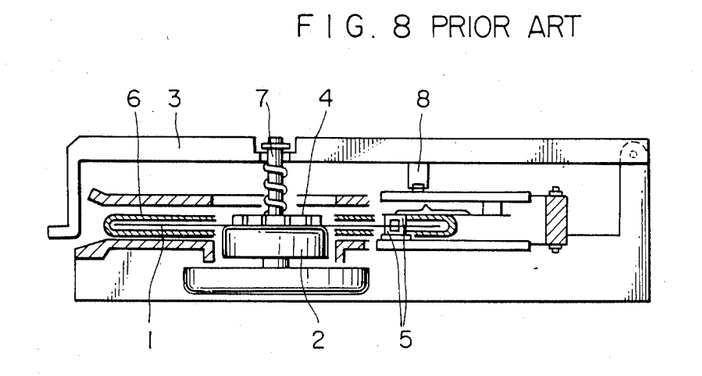

FIGS. 7 and 8 are cross-sectional views of the floppy disk unit in which the recording medium is discharged and is inserted respectively.

In the condition shown in FIG. 7, the recording medium (the recording disk 1 covered by the protection case 6) is inserted, and when the door 3 is closed, the read-write head 5 is brought into contact with the recording disk 1 through an arm 8 connected to the door 3, the recording and reproduction operation is started in the condition of FIG. 8.

Figure 9:
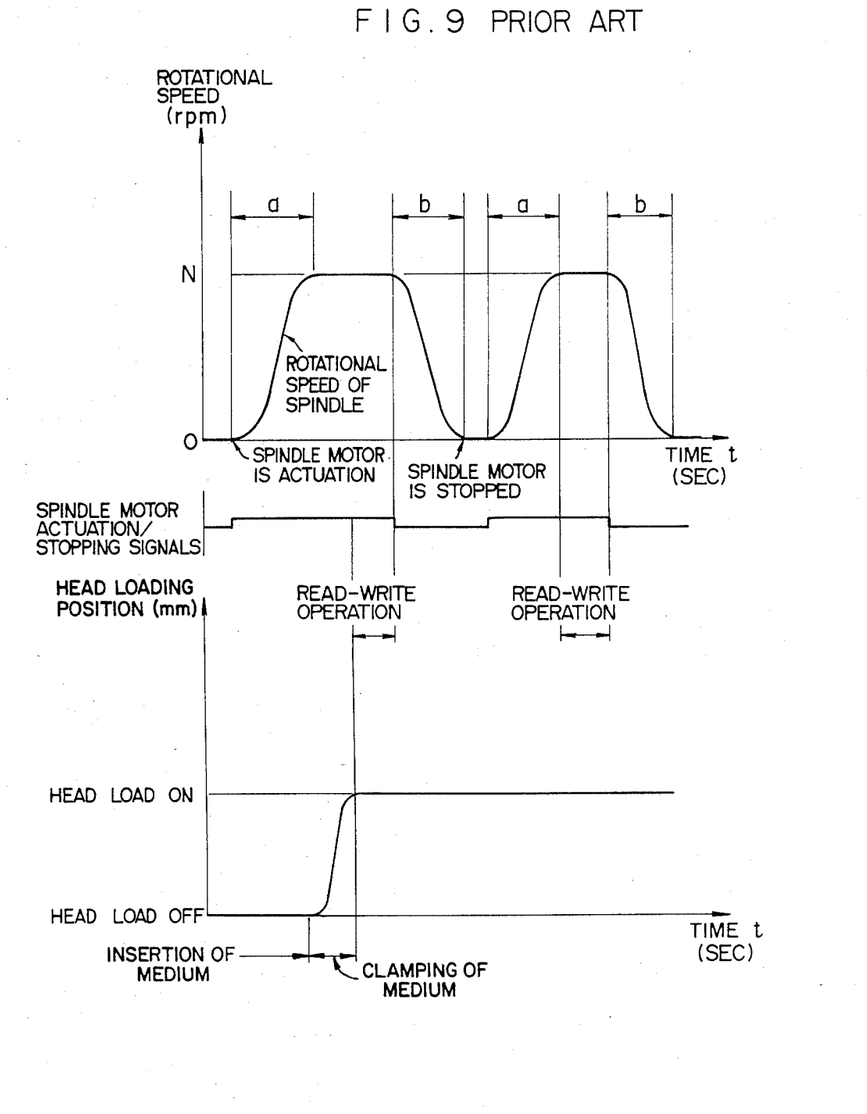
FIG. 9 is an operation time chart of the prior art floppy disk drive of FIGS. 7 and 8.

The operation in the conditions in FIGS. 7 and 8 is illustrated in FIG. 9.

In the condition of FIG. 7 in which the recording medium is not yet inserted, when a SPINDLE MOTOR ACTUATING SIGNAL is inputted from the floppy disk controller, the spindle motor 2 is actuated, and the rotational speed is increased to the steady rotational speed N [rpm]. Then, when the recording medium is inserted just before the recording and reproduction operation, the condition of FIG. 7 is changed to the condition of FIG. 8, and the recording disk 1 is clamped by the collet 4, and at the same time, the read-write head 5 is brought into contact with the recording disk 1 (head load ON), and the recording and reproduction operation is started. When the recording and reproduction operation is finished, by a spindle motor actuation stopping signal inputted thereto, the rotation of the spindle motor is stopped. In this respect, such unit is described, for example, in Japanese Utility Model Unexamined Publication No. 51-85710 (1976).

As will be apparent from FIG. 9, since the spindle motor is actuated and stopped repeatedly every time the recording and reproduction operation is required, the power consumption can be reduced as compared with the method shown with reference to FIG. 5 in which the spindle motor is always rotating. However, at the same time when the recording medium is inserted, it becomes the head load ON condition and the read-write head 5 is maintained in contact with the recording disk 1. Accordingly, wear and demagnetization of the magnetic surface of the recording medium are further increased, and the life of the recording disk 1 is shortened. Furthermore, when the read or write is not carried out, the recording disk 1 and the read-write head 5 are stopped in a contact with each other. The surface of the disk and that of the head facing are mirror-like surfaces and if such mirror-like surfaces are in contact with each other for a long time, the two surfaces are joined with each other by moisture in the air. If the disk is forced to rotate when the surfaces are joined with each other the magnetic layer of the disk surface is removed, and the data may be destroyed. Further, the recording medium may become unable to be discharged because the two surfaces are joined with each other.

Rapid progress has been made in making the floppy disk units in much smaller size and with larger capacity, and due to this fact, improvement in the reliability of the recording medium and reduction of power consumption of the units are indispensable requirements.

In ordinary floppy disk drives, the rotational speed of the spindle is about 360 r.p.m. to 400 r.p.m. at read/write operation. Two types of methods for inserting the disk into the disk driver are known. In one method, the disk is inserted when the spindle is not rotated. In the other method, the disk is inserted while the spindle rotates. The rotational speed of the spindle at the disk inserting operation is a low speed (e.g. less than 360 r.p.m.) if the operator immediately inserts the floppy disk into the driver just after the spindle is started. However, if the operator inserts the disk after the spindle is started, the rotational speed of the spindle is a steady speed (e.g. 360 r.p.m.). According to the other method, the floppy disk is accurately clamped and held between the spindle and collet because the center of the floppy disk is guided by the rotating spindle and the tapered outer peripheral surface of the collet which are rotating. On the other hand, according to the first mentioned method, the inner edge of the floppy disk may be inserted between the tapered outer peripheral surface of the collet and the tapered circumferential surface of the concave portion in the spindle, and the floppy disk may be deformed.

SUMMARY OF THE INVENTION

The object of the present invention is to provide a method and means for driving a magnetic disk, to prevent wear and demagnetization of a recording medium and to prevent adhesion of the magnetic medium surface to a recording-playback head, and at the same time, reduce power consumption.

In order to achieve the above object, according to the present invention, in a magnetic disk drive having a mechanism to rotate a recording medium by clamping the medium on both sides, and a loading mechanism to bring a recording-playback head into contact with the recording medium, is characterized in that at the time of recording and reproduction, the rotating mechanism and the loading mechanism are actuated, and at the completion time of the recording and reproduction, the rotating mechanism is stopped or decelerated to a rotational speed less than the read/write steady speed simultaneously with release of the loading mechanism or after the lapse of a predetermined time from the release.

DESCRIPTION OF THE PREFERRED EMBODIMENTS

The embodiments of the present invention will be described with reference to the drawings.

Figure 4:
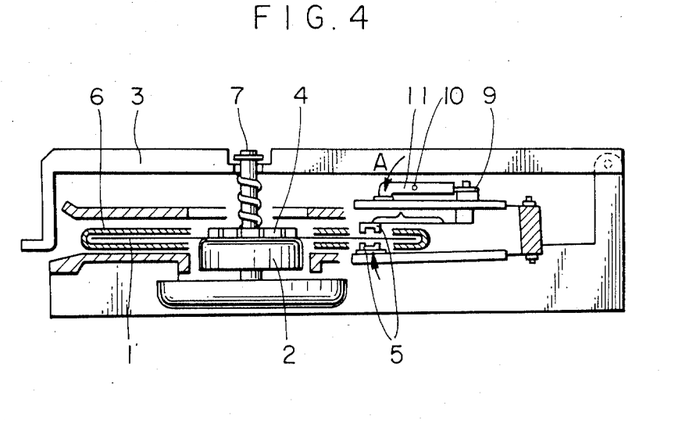
FIG. 4 is a cross-sectional structure view of the floppy disk drive to which the present invention is applicable.

FIG. 4 is a cross-sectional structure view of a floppy disk drive showing an embodiment of the present invention.

Like reference numerals are used in FIGS. 4 and 5 to designate like parts.

The floppy disk drive of FIG. 4 differs from that of FIG. 5 in the manner of operation, in that at the time of performing recording and reproduction, a spindle motor and head loading are driven. These are not driven even when a recording medium is inserted, until spindle motor and head loading driving signals are inputted from a floppy disk controller, then they are driven simultaneously. In this case, a time period until the spindle motor reaches its steady rotational speed is made longer than a head loading time period, and also when the spindle motor is to be stopped upon completion of the recording and reproduction, the head loading is made to become an OFF condition before the spindle motor stops completely.

In the condition shown in FIG. 4, a recording disk 1 is clamped and held by a spindle 2, and the spindle 2 is in its stopping condition. At this time, a recording-playback head 5 is in a condition apart from the recording disk 1, that is, in a head load off condition. There is provided a mechanism (which may be the same mechanism as in FIG. 5) which causes the recording-playback head 5 to be pressed toward the recording disk 1 (a direction of the arrow A) by energizing a solenoid 9. When the spindle motor and head loading signals are inputted from a floppy disk controller, the spindle 2 is driven to rotate, and at the same time, the solenoid 9 is energized and the recording-playback head 5 is brought into contact with the recording disk 1, and thus the recording and reproduction become possible.

Figure 1:
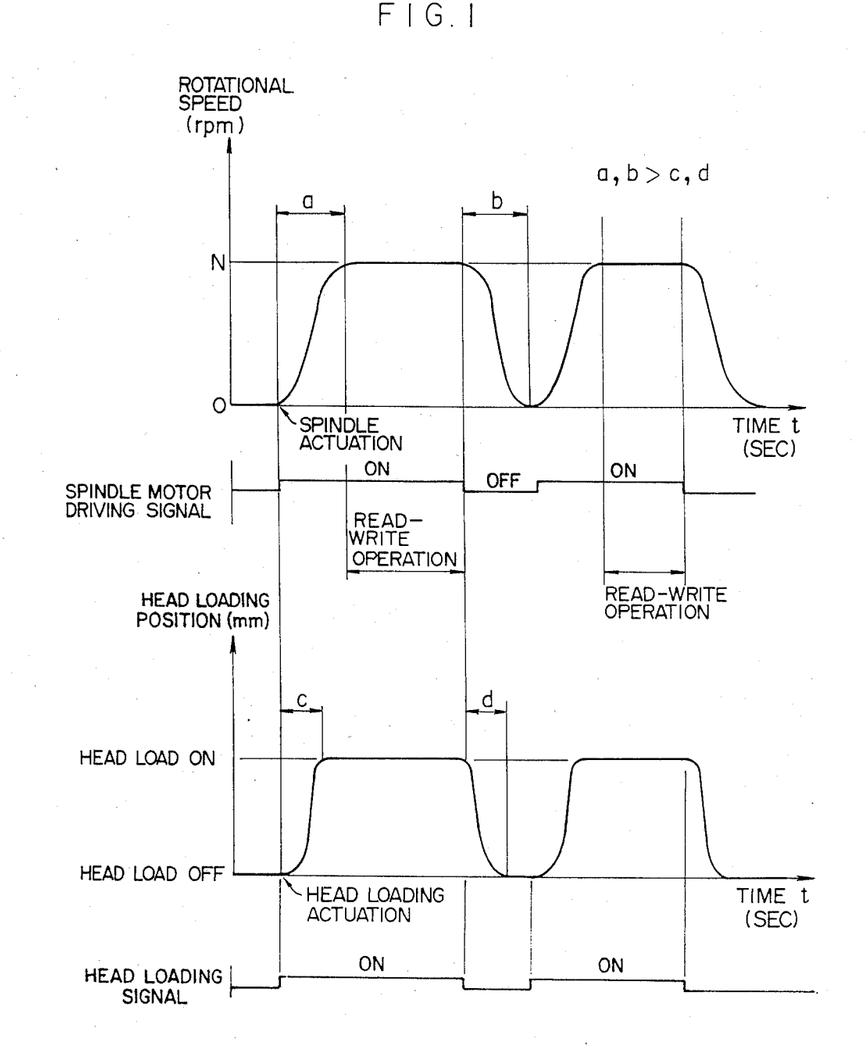
FIGS. 1, 2, and 3 are operation time charts of a floppy disk drive showing respectively first, second, and third embodiments of the present invention.

FIG. 1 is an operation time chart of the floppy disk unit showing a first embodiment of the present invention.

In FIG. 1, the floppy disk drive has already been in the condition of FIG. 4, and the recording medium is accommodated in the drive, and the recording disk 1 is clamped by the spindle 2 and the collet. The spindle 2 is in a stopping condition, and the recording-playback head 5 is in a head load off condition.

In order to record or reproduce information, when the spindle motor and head loading signals are inputted, the spindle and the head loading mechanism are actuated simultaneously as shown in FIG. 1. When the spindle motor is actuated, the rotational speed increases with time, and reaches the steady rotational speed N. It is assumed that a time taken from the actuation to the arrival at the speed N is a seconds. On the other hand, when the solenoid 9 is energized, the recording-playback head 5 is energized and is brought into contact with the recording disk 1. It is assumed that a time period for changing a condition from a separated condition of the recording-playback head 5 from the recording disk 1 (head load OFF condition) to a contact condition of the recording-playback head 5 with the recording disk 1 (head load ON) is c seconds. When the time period a is longer than the time period c, the recording and reproduction operation becomes possible after the lapse of a seconds from the actuation of the spindle motor.

Next, when the recording and reproduction operation is completed, since the spindle motor and head loading signals are cut-off, the rotation condition of the spindle motor is changed to a stopping condition, and it stops in b seconds. At the same time, since the energization of the solenoid 9 is also terminated, the recording-playback head 5 is separated from the recording disk 1 by a force of a spring which is built in the drive or head loading mechanism, and after a time of d seconds, it becomes the head load OFF condition again. The head 5 is loaded and unloaded by the head loading driving signals.

Figure 10:
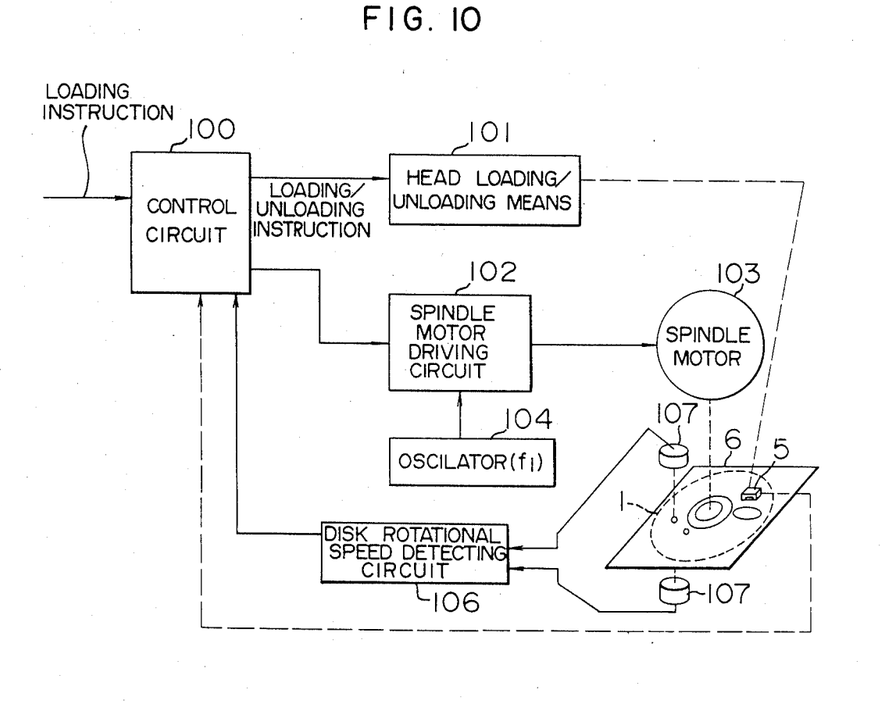
FIGS. 10 and 11 show the circuit arrangement and the flow chart of the first embodiment of the present invention.

Referring to FIG. 10, the circuit arrangement of the first embodiment will be described hereinafter. The circuit arrangement is formed by a control circuit 100, a head loading/unloading mechanism 101 having a solenoid for loading the head and a head supporting mechanism, a spindle motor 103, an oscillator 104 producing the frequency signal of the frequency $f_1$, a spindle motor driving circuit 102 for driving and rotating the spindle motor 103 by utilizing the frequency $f_1$ oscillated by the oscillator 104, and a rotational speed detecting circuit 106 for detecting the rotational speed of the disk 1 by utilizing optical sensors 107. The circuit arrangement as shown in FIG. 10 illustrates the fundamental parts of the invention. In an actual circuit arrangement, it is fully understood by those skilled in the art that the control circuit 100 controls a read/write circuit or the like.

The control circuit 100 controls the motor driving circuit 102 to rotate the spindle motor 103 at the oscillated frequency $f_1$, and loads and unloads the head 5 by using the head loading/unloading mechanism on the basis of the loading instruction. The flow of the operation of the circuit arrangement will be described hereinafter by referring to FIG. 11.

Figure 11:
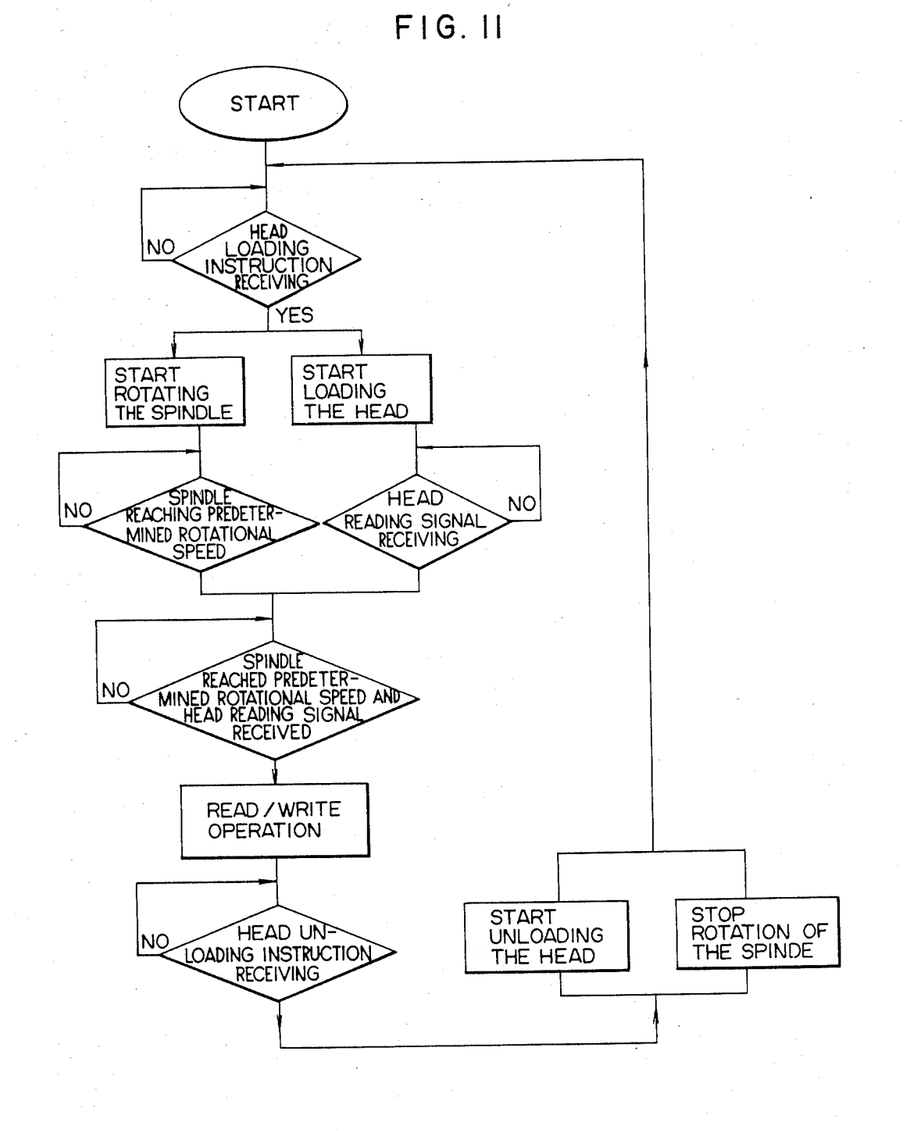

First, the control circuit 100 loads the head 5 by utilizing the loading mechanism 101, and instructs the spindle driving circuit 102 to start the rotation of the spindle when the circuit 100 receives the loading instruction from the floppy disk controller. Secondly, the read/write operation is carried out when the rotational speed of the floppy disk 1 detected by the circuit 106 reaches at the predetermined speed (exp. 360 r.p.m.) and the head 5 outputs read out signals (the head is completely loaded on the disk 1). Thirdly, the control circuit 100 unloads the head 5 by utilizing the loading mechanism 101, and stops the motor 103 through the circuit 102 when the control circuit 100 receives the unloading instruction from the floppy disk controller.

As described above, in this embodiment, the following features are provided.

(a) When the recording-playback head 5 is brought into contact with the recording disk 1, the recording disk 1 has already been rotating.

(b) When the recording disk 1 stops, the recording-playback head 5 has already been separated from the recording disk 1.

Therefore, according to this embodiment, under a spindle stopping condition, since the recording-playback head 5 is never brought into contact with the recording disk 1, wear and demagnetization of the magnetic surface of the recording disk 1 are reduced, and adhesion of the recording-playback head 5 to the surface of the recording disk is prevented. Further, since the spindle motor is not rotated continuously, power consumption can be reduced.

Furthermore, so long as the above-mentioned conditions (a) and (b) are satisfied, it is not necessarily required to make the timing of the start of the actuation operation and the stopping operation of the spindle motor respectively coincide with the start of the head load ON operation and the head load OFF operation, and there may be a difference between the times of start of respective operations and between the times of completion of respective operations. For example, by inputting only the head loading actuation and stopping signals from the floppy disk controller, the spindle motor may be actuated and stopped respectively delayed from the actuation time and the stopping time of the head loading.

Figure 2:
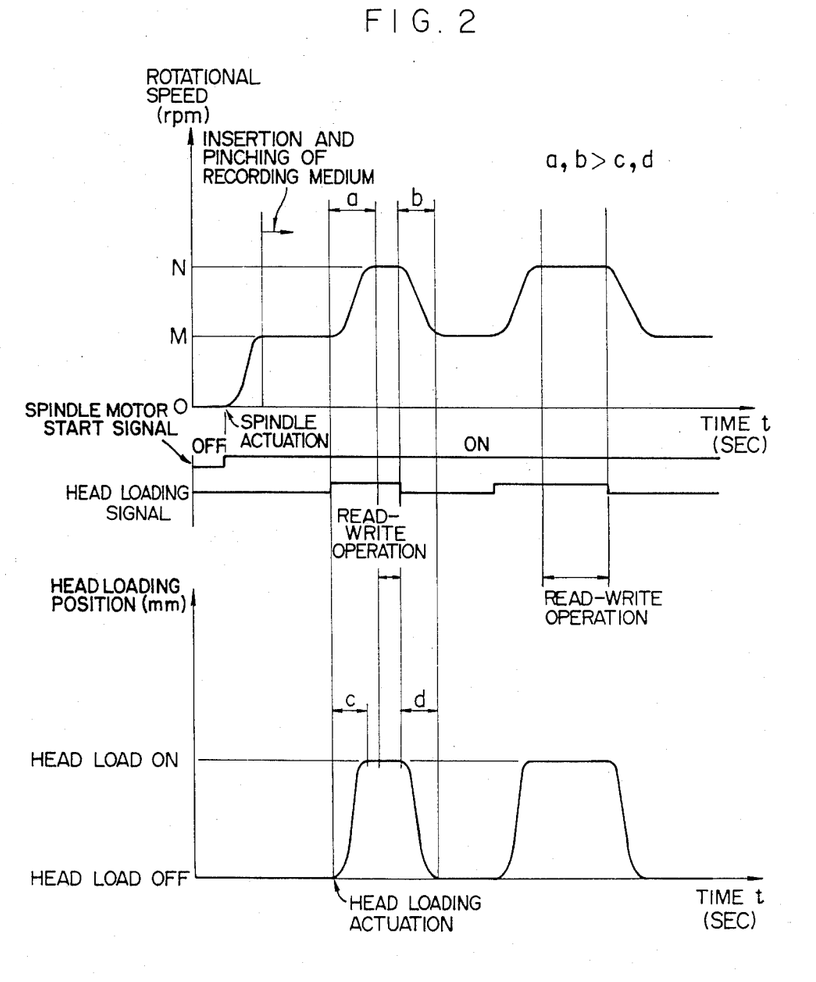

FIG. 2 is an operation time chart of the floppy disk drive showing a second embodiment of the present invention.

In the near future, the rotational speed of floppy disks must be about two times (720–800 r.p.m.) as fast as the rotational speed of present floppy disks at the read/write operation in order to further densify the information to be recorded and to accelerate the data transferring speed to a internal unit from the floppy disk.

In the method of inserting the disk as the spindle is rotating, if the floppy disk is inserted and held by the spindle and collet which are rotating at high speed (720 r.p.m. to 800 r.p.m.), the thin inner edge of the floppy disk may be damaged by the tapered outer peripheral surface of the collet.

In the embodiment of FIG. 2, as an operation which satisfies the conditions (a) and (b) mentioned above, a low speed condition at a second rotational speed M is placed between a stopping condition of the spindle 2 and a steady rotational speed condition rotating at a first rotational speed, and insertion of the recording disk 1 and clamping thereof are carried out in this low speed condition, and recording and reproduction operation is carried out only in the steady rotational speed condition.

First, the spindle 2 is actuated, and after the rotational speed has increased to the second rotational speed M, the insertion of the recording medium and the pinching thereof are carried out. Thereafter, so long as no signal is inputted from the floppy disk controller, the low speed condition of the rotational speed M is maintained. When recording and reproduction of information is to be carried out, the spindle motor and head loading driving signals are inputted from the floppy disk controller, and by these signals, the spindle motor is changed from the low speed condition to the high speed condition at the steady rotational speed N, and at the same time, the head load OFF condition is changed to the head loan on condition. When the recording and reproduction is completed, by the stopping signal from the floppy disk controller, the spindle motor is changed from the high speed condition to the low speed condition, and at the same time, the head load ON condition is changed to the head load OFF condition.

In this case also, it is naturally necessary to satisfy the conditions a>c, and b>d.

Figure 12:
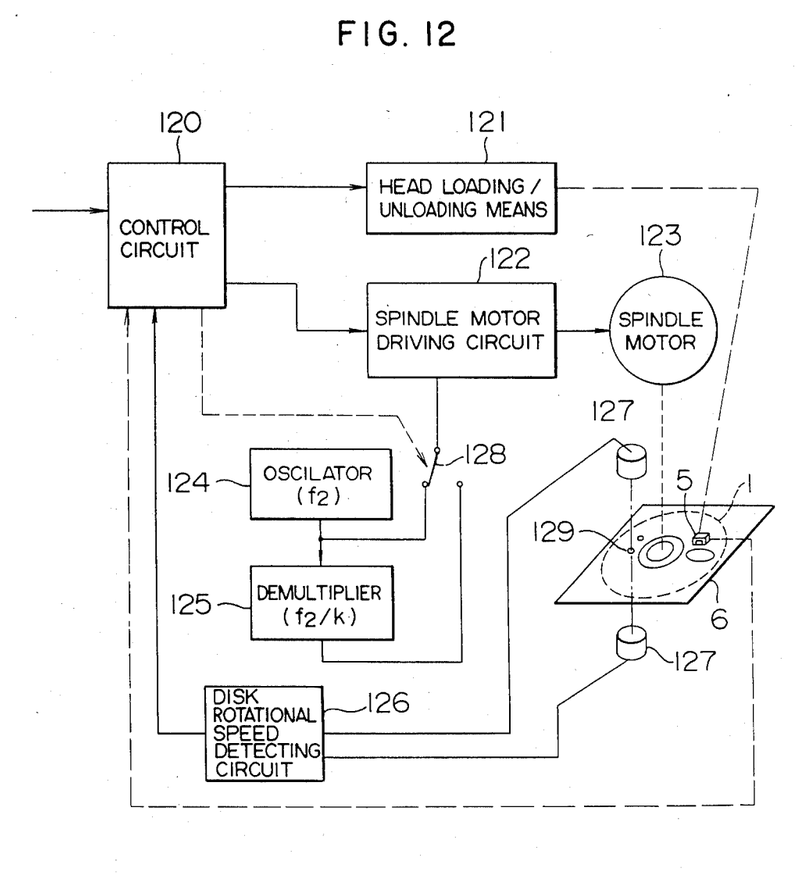
FIGS. 12 and 13 show the circuit arrangement and the flow chart of the second embodiment of the present invention.
Figure 13:
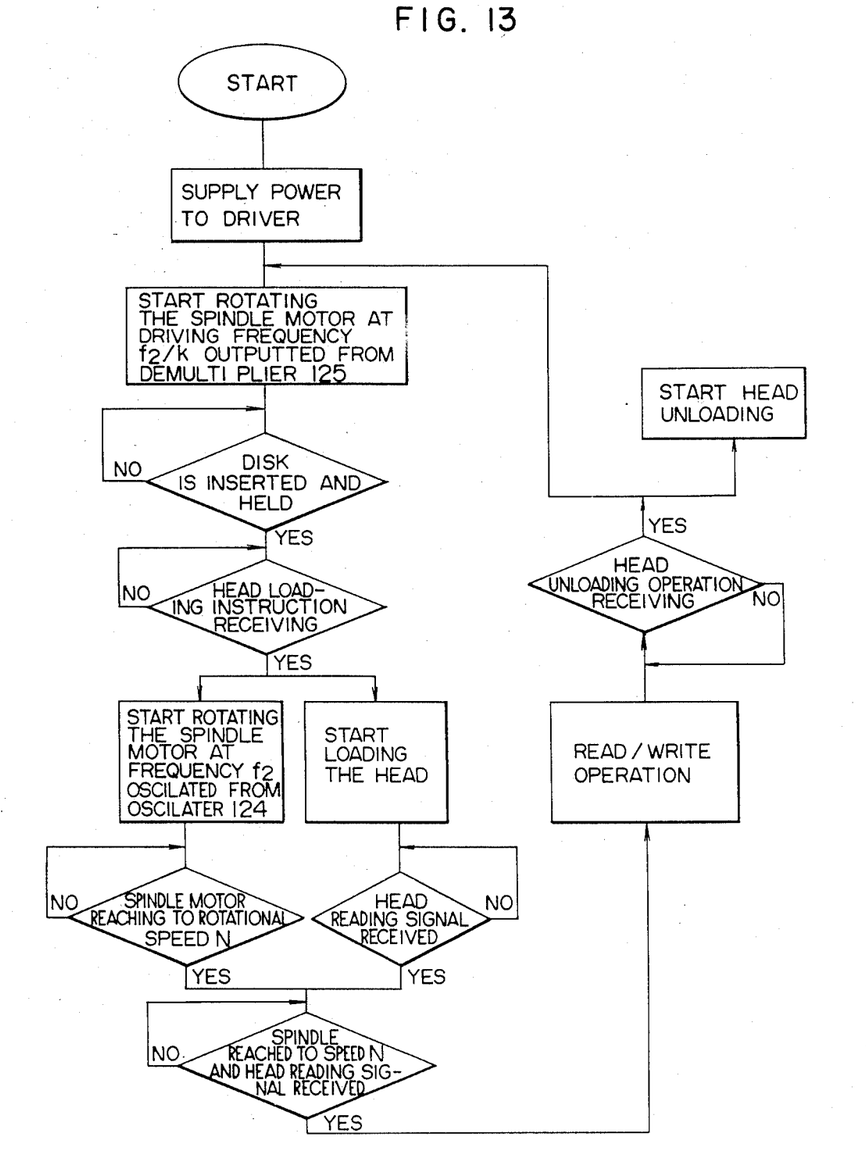

FIGS. 12 and 13 show the circuit arrangement and the flow chart to operate the second embodiment of the invention. As to the difference between the circuit arrangements of the first and second embodiments shown in FIGS. 10 and 12, according to the second embodiment, the motor 123 driving frequency applied to the spindle motor driving circuit 122 is divided into the frequency $f_2$ oscillated by the oscillator 124 and the frequency $f_2/k$ demultiplied by the frequency demultiplier 125. The frequencies $f_2$ and $f_2/k$ are switched over with each other by the switch 128.

The operation of the second embodiment is described hereinafter by using the flow chart shown in FIG. 13. First, the spindle is rotated at the rotational speed M (exp. 360 r.p.m.) by the frequency $f_2/k$ when the power is applied to the circuit arrangement. Secondly, the control circuit 120 rotates the disk at the frequency $f_2$, and starts the head to load on the disk when the head loading instruction is inputted to the circuit 120 and the disk is clamped and held by the spindle and the collet. The frequency $f_2/k$ is obtained by demultiplying the frequency $f_2$ oscillated by the oscillator 124. The character k represents a natural number which may be preferably 2 (i.e. $f_2=720$ r.p.m., $f_2/k=360$ r.p.m.). The control circuit 120 changes the driving frequency $f_2/k$ into $f_2$ by switching over the switch 128. Thirdly, the read/write operation is carried out when the rotational speed of the disk 1 reaches at the predetermined speed (exp. 720 r.p.m.) and the head 5 is completely loaded on the disk 1. Fourthly, the control circuit 120 controls the loading/unloading mechanism 121 and the driving circuit 122 to unload the head and to return the rotational speed of the spindle motor to the second rotational speed when the head unloading instruction is inputted to the control circuit 120.

As described above, according to the second embodiment of the invention, the disk can be inserted accurately without deforming the disk because the disk is inserted while the spindle is rotating at a low speed. The second rotational speed M may be 720 r.p.m. or 360 r.p.m.

According to the second embodiment of the invention, since as a time period until the recording and reproduction can be started (access time), it is only necessary to have a time period which is required to increase the rotational speed from M to N, the access time can be reduced as compared with that in FIG. 1.

Figure 3:
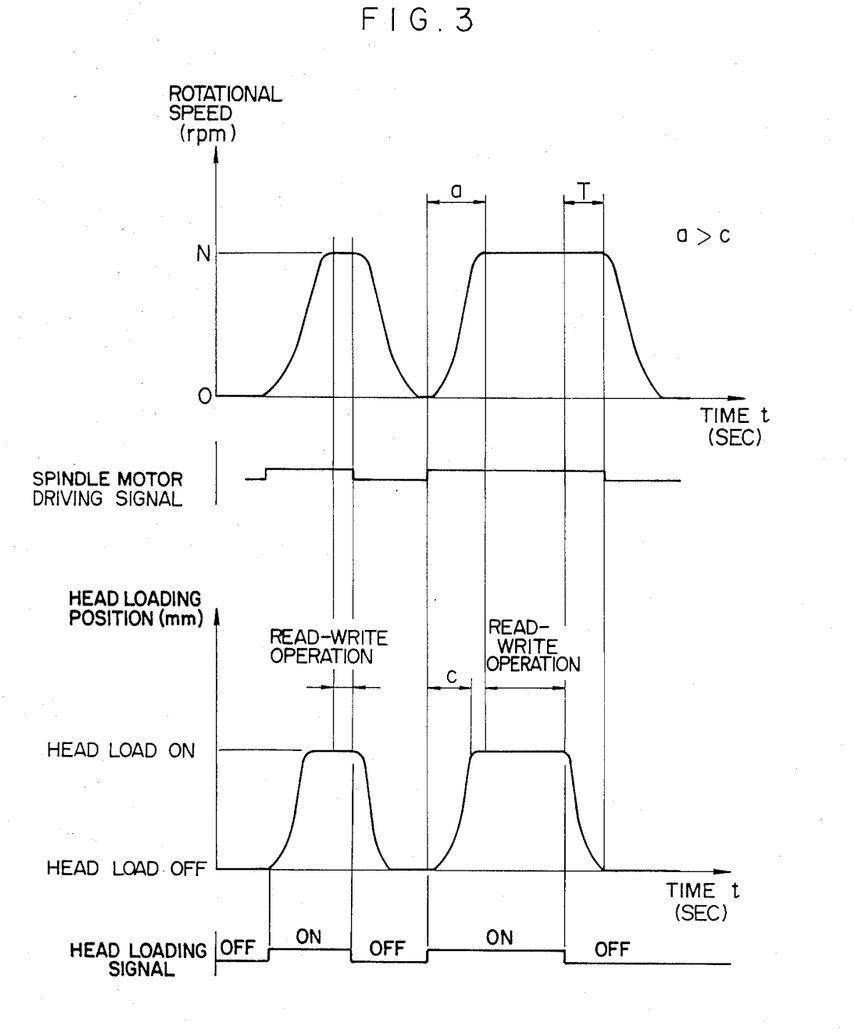

FIG. 3 is an operation time chart of the floppy disk drive showing a third embodiment of the present invention.

In the case of FIG. 3, the spindle motor is made to continuously rotate for a fixed time period of T seconds at the time of stopping in the case of FIG. 1. In other words, in the embodiment of FIG. 1, a time period (access time) from the inputting of the spindle motor and head loading driving signals to the start of the recording and reproduction operation is determined by a time period of a seconds from the actuation of the spindle motor to the arrival at the steady condition of the rotational speed N. In contrast in the embodiment of FIG. 3, although the recording-playback head 5 is unloaded after the completion of the recording and reproduction operation, since the spindle motor rotates for the fixed time period of T seconds continuously, if a command to carry out recording and reproduction is again inputted from the floppy disk controller during this time period of T seconds, the spindle motor may be rotated at the high speed it is at and only the recording-playback head 5 may be changed to the head load ON condition. Supposing that a time period from the head load OFF condition to the head load ON condition is c seconds, since $c<a$, the access time corresponds to c seconds, and thus the access time is reduced as compared with the access time of a seconds in the case of FIG. 1. It is natural that if no command is inputted from the floppy disk controller during the time period of T seconds, the rotation of the spindle 2 is stopped.

As described in the foregoing, according to the present invention, at the time of recording and reproduction, the spindle is driven at the steady rotational speed, and the head loading is carried out, and the recording-playback head 5 is unloaded except during the time of recording and reproduction. Thus, the spindle motor is not continuously rotated at the steady rotational speed (the first rotational speed N), and thus power consumption can be reduced as compared with the prior art method. Further, since the recording-playback head and the recording medium are not always in contact with each other, as compared with the prior art method in which these members are maintained in contact with each other, wear of the recording medium is reduced, thus extending its useful life. Also demagnetization action can be reduced. Furthermore, during the stopping period of the recording medium, since the recording playback head and the recording medium are not in contact with each other, adhesion therebetween is prevented, and it is possible to eliminate disadvantages such as data being destroyed, or the recording medium not being able to be discharged, or the like.

We claim:

1. A disk drive to be connected to and controlled by a controller, comprising:
   clamping means for clamping a recording medium;
   a motor for rotating said recording medium clamped by said clamping means;
   a motor driving circuit for driving said motor to rotate at predetermined rotational speeds;
   loading means for bringing a read-write head into contact with said recording medium; and
   a control circuit for controlling said motor driving circuit and said loading means, said control circuit being arranged such that when said disk drive is selected by said controller to carry out a read-write operation, said control circuit controls said motor driving circuit to rotate said motor at a first rotational speed, and controls said loading means such that said read-write head approaches and makes contact with said recording medium;
   said control circuit being further arranged such that when said read-write operation is finished, said control circuit controls said loading means such that said read-write head retracts from said recording medium, and controls said motor driving circuit to rotate said motor at a second rotational speed which is less than said first rotational speed and greater than zero, either simultaneously with the start of the retraction of said head from said recording medium or at a predetermined time after the start of the retraction of said head, said second rotational speed being maintained until said rotating means and loading means are again actuated for another read-write operation.

2. A disk drive according to claim 1, wherein said second rotational speed is 1/k of said first rotational speed, k being an integer greater than 1.

3. A disk drive according to claim 2, wherein said first rotational speed is 720 r.p.m. or greater.

4. A method of driving a disk in a disk drive having means including a spindle for rotating said disk; means for pressing said disk onto said spindle; and loading means for bringing a read-write head into contact with said disk, said method comprising the steps of:

clamping said disk between said spindle and said pressing means;

actuating said rotating means to rotate at a first rotational speed during a time of recording and reproduction and simultaneously actuating said loading means during said time of recording and reproduction to bring said head into contact with said disk;

decelerating said rotating means, upon completion of said recording and reproduction, to a second rotational speed which is less than said first rotational speed and greater than zero, and either simultaneously or at a predetermined time later, retracting said head from said disk; and maintaining said second rotational speed until said rotating means and loading means are again actuated for another recording and reproduction.

5. A method according to claim 4, wherein said disk is provided with a center hole and said pressing means includes a collet by which said disk is guided, such that a center of said disk is brought substantially to a center of said spindle, said method further comprising the step of:

prior to said clamping step, actuating said rotating means to rotate said spindle at said second rotational speed, said clamping step thereby being carried out while said spindle is rotated at said second rotational speed.

6. A disk drive according to claim 4, wherein said second rotational speed is 1/k of said first rotational speed, where k is an integer greater than 1.

7. A method according to claim 6, wherein said first rotational speed is 720 r.p.m. or greater.

8. A method according to claim 4, wherein said rotational speed is 1/k of said first rotational speed, where k is an integer greater than 1.

9. A disk drive to be connected to and controlled by a controller, comprising:

clamping means for clamping a recording medium;

a motor for rotating said recording medium clamped by said clamping means;

a motor driving circuit for driving said motor to rotate at a predetermined rotational speed;

loading means for bringing a read-write head into contact with said recording medium; and a control circuit for controlling said motor driving circuit and said loading means, said control circuit being arranged such that when said disk drive is selected by said controller to carry out a read-write operation, said control circuit controls said motor driving circuit to rotate said motor at a first rotational speed, and controls said loading means such that said read-write head approaches and makes contact with said recording medium;

said control circuit being further arranged such that upon completion of said read-write operation, said control circuit controls said loading means such that said read-write head retracts from said recording medium, and controls said motor driving circuit to rotate said motor at a second rotational speed, which is less than said first rotational speed and greater than zero, either simultaneously with the completion of the retraction of said read-write operation or at a predetermined time after the completion of said read-write operation, said second rotational speed being maintained until said rotating means and loading means are again actuated for another read-write operation.

10. A disk drive according to claim 9, wherein said first rotational speed is 720 r.p.m. or greater.

* * * * *